(12) United States Patent
Liu et al.

(10) Patent No.: US 11,346,665 B2
(45) Date of Patent: May 31, 2022

(54) METHOD AND APPARATUS FOR PLANNING SAMPLE POINTS FOR SURVEYING AND MAPPING, CONTROL TERMINAL, AND STORAGE MEDIUM

(71) Applicant: GUANGZHOU XAIRCRAFT TECHNOLOGY CO., LTD, Guangdong (CN)

(72) Inventors: Peng Liu, Guangdong (CN); Xiaohui Jin, Guangdong (CN)

(73) Assignee: GUANGZHOU XAIRCRAFT TECHNOLOGY CO., LTD, Guangdong (CN)

( * ) Notice: Subject to any disclaimer, the term of this patent is extended or adjusted under 35 U.S.C. 154(b) by 62 days.

(21) Appl. No.: 16/629,515

(22) PCT Filed: Nov. 21, 2018

(86) PCT No.: PCT/CN2018/116657
§ 371 (c)(1),
(2) Date: Jan. 8, 2020

(87) PCT Pub. No.: WO2020/103020
PCT Pub. Date: May 28, 2020

(65) Prior Publication Data
US 2021/0223040 A1 Jul. 22, 2021

(51) Int. Cl.
*H04N 5/00* (2011.01)
*G01C 11/02* (2006.01)
(Continued)

(52) U.S. Cl.
CPC ........... *G01C 11/02* (2013.01); *G05D 1/0094* (2013.01); *G06T 7/74* (2017.01); *H04N 5/23216* (2013.01);
(Continued)

(58) Field of Classification Search
CPC . G01C 11/02; G06T 7/74; G06T 2207/10032; G05D 1/0094; H04N 5/23216; H04N 5/265; G06F 3/04883
See application file for complete search history.

(56) References Cited

U.S. PATENT DOCUMENTS

| 9,618,934 B2 | 4/2017 | Deroos et al. |
| 2010/0013927 A1 | 1/2010 | Nixon |

(Continued)

FOREIGN PATENT DOCUMENTS

| CN | 106477038 A | 3/2017 |
| CN | 107702692 A | 2/2018 |

(Continued)

OTHER PUBLICATIONS

Yang. "CN108846004A Translation". Nov. 20, 2018. (Year: 2018).*
(Continued)

*Primary Examiner* — Zhihan Zhou
(74) *Attorney, Agent, or Firm* — ArentFox Schiff LLP (57) ABSTRACT

A method for planning sample points for surveying and mapping is disclosed, which includes: acquiring a reference photographing location point corresponding to a region to be surveyed and mapped, and establishing a mapping relation between one shooting point in a combined shooting point set and the reference photographing location point; determining a plurality of auxiliary photographing location points corresponding to the reference photographing location point based on the mapping relation preset relative positional relations between the shooting points in the combined shooting point set; and using the reference photographing location point and the plurality of auxiliary photographing location points as sample points for surveying and mapping based on which an unmanned aerial vehicle for surveying and mapping performs surveying and mapping in the region to be surveyed and mapped. An apparatus for planning
(Continued)

sample points for surveying and mapping, a control terminal, and a storage medium are also disclosed.

15 Claims, 4 Drawing Sheets

(51) Int. Cl.
    *G06T 7/73*         (2017.01)
    *G05D 1/00*         (2006.01)
    *H04N 5/232*        (2006.01)
    *H04N 5/265*        (2006.01)
    *G06F 3/04883*     (2022.01)

(52) U.S. Cl.
    CPC ......... *H04N 5/265* (2013.01); *G06F 3/04883* (2013.01); *G06T 2207/10032* (2013.01)

(56) References Cited

U.S. PATENT DOCUMENTS

| | | | |
|---|---|---|---|
| 2016/0116280 A1 | 4/2016 | Joyce et al. | |
| 2016/0180144 A1* | 6/2016 | Tatourian | G06T 3/0068 |
| | | | 382/104 |
| 2016/0202695 A1 | 7/2016 | Deroos et al. | |
| 2017/0138732 A1 | 5/2017 | Pettersson et al. | |
| 2017/0221241 A1 | 8/2017 | Hannah | |
| 2018/0314257 A1* | 11/2018 | Nishita | G05D 1/101 |
| 2019/0156566 A1* | 5/2019 | Chen | G01C 21/32 |

FOREIGN PATENT DOCUMENTS

| | | |
|---|---|---|
| CN | 107990897 A | 5/2018 |
| CN | 108762293 A | 11/2018 |
| CN | 108846004 A | 11/2018 |
| EP | 3399276 A1 | 11/2018 |
| JP | 201045693 A | 2/2010 |
| RU | 2012116074 A | 10/2013 |
| RU | 2015107561 A | 9/2016 |

OTHER PUBLICATIONS

Chen et al. "CN106477038A Translation". Mar. 8, 2017. (Year: 2017).*
International Search Report for the International Application No. PCT/CN2018/116657 (dated Aug. 9, 2019), 4 pages.
Written Opinion of International Search Authority for the International Application No. PCT/CN2018/116657 (dated Aug. 9, 2019), 5 pages.
Office Action dated Jan. 28, 2020 for corresponding Australian application No. 2018426323, IP Australia.
Office Action dated Aug. 7, 2020 for corresponding European application No. 18920197.3, European Patent Office.
Office Action dated Jun. 25, 2021 for corresponding Indian application No. 202017004107, Indian Patent Office.
Office Action dated May 13, 2021 for corresponding Japanese application No. 2020-511741, Japanese Patent Office.
Office Action dated Sep. 28, 2021 for corresponding Korean application No. 10-2020-7006220, Korean Patent Office.
Second Office Action dated Dec. 21, 2020 for corresponding European application No. 18920197.3, European Patent Office.
Third Office Action dated Apr. 23, 2021 for corresponding European application No. 18920197.3, European Patent Office.
Grant Notification dated Jul. 17, 2020 for corresponding Australian application No. 2018426323, IP Australia.

* cited by examiner

METHOD AND APPARATUS FOR PLANNING SAMPLE POINTS FOR SURVEYING AND MAPPING, CONTROL TERMINAL, AND STORAGE MEDIUM

CROSS-REFERENCE TO RELATED APPLICATIONS

This application is a 371 U.S. national stage of PCT/CN2018/116657, filed Nov. 21, 2018, the contents of which are incorporated herein by reference.

TECHNICAL FIELD

Embodiments of the present disclosure relate to the technical field of surveying and mapping, and, for example, to a method and an apparatus for planning sample points for surveying and mapping, a control terminal, and storage medium.

BACKGROUND ART

In recent years, unmanned aerial vehicles (UAVs) have been widely used in the fields of surveying and mapping, emergency response, disaster relief, and the like due to their characteristics such as high efficiency, flexibility, and low cost. The UAV-based aerial surveying and mapping (abbreviated as "aerial survey") technology can greatly reduce the work period, and the investment of manpower and financial resources involved in traditional aerial surveying and mapping technologies, and has more realistic significance in the fields of surveying and mapping and the like.

In the UAV-based aerial surveying and mapping technology, the observation of the current situation of an aerially photographed region is carried out by the mounted video capture device using an remote image transmission technology, and at the same time the taken photos are stitched by using an aerially photographed image stitching (mosaic) technology to obtain an overall image of the aerially photographed region. In the traditional UAV-based aerial survey method, when photos are being taken, in general, mobile surveying and mapping is performed in a region to be surveyed and mapped in a traversal manner along parallel lines, and a certain degree of overlap between each two successive photos is usually required for ensuring a successful stitching. Each photo is required to overlap with other photos to a certain degree in both horizontal and vertical directions in order to ensure normal stitching in the later stage, and in general, the degree of overlap is generally required to be greater than 50% in order to ensure the normal stitching in the later stage.

During the implementation of the present disclosure, the inventors have found that the relevant techniques in the prior art have the following disadvantages that the traditional UAV-based aerial survey methods are all used for surveying and mapping an aerially photographed region of a large-area land and it is necessary to take multiple photos having a relatively high degree of overlap during the surveying and mapping. Stitching the above photos taken by the UAV takes a long time and has a low efficiency. In addition, if the photos acquired by the UAV are uploaded to a server for stitching processing, the processes of data uploading and processing takes a longer time. Moreover, when the traditional UAV-based aerial survey method is applied to surveying and mapping of a small plot of land, not only the operation is complicated and a long processing time is required, but also high hardware cost is involved.

SUMMARY

Embodiments of the present disclosure provide a method and an apparatus for planning sample points for surveying and mapping, a control terminal, and storage medium, so as to reduce the surveying and mapping cost and improve the surveying and mapping efficiency.

An embodiment of the present disclosure provides a method for planning sample points for surveying and mapping, comprising steps of:
  acquiring a reference photographing location point corresponding to a region to be surveyed and mapped, and establishing a mapping relation between one shooting point in a combined shooting point set and the reference photographing location point;
  determining a plurality of auxiliary photographing location points corresponding to the reference photographing location point based on the mapping relation and a preset relative positional relation between each two shooting points in the combined shooting point set; and
  using the reference photographing location point and the plurality of auxiliary photographing location points as sample points for surveying and mapping based on which an unmanned aerial vehicle for surveying and mapping performs surveying and mapping in the region to be surveyed and mapped.

Optionally, the shooting points in the combined shooting point set include: a central shooting point and four peripheral shooting points, wherein the peripheral shooting points are four vertices of a rectangle centered at the central shooting point;
  wherein a composite photo obtained by shooting based on all the shooting points in the combined shooting point set is of a rectangular shape.

Optionally, acquiring a reference photographing location point corresponding to a region to be surveyed and mapped comprises:
  detecting a touch operation performed by a user in a human-computer interaction interface and determining a screen location point based on the touch operation; and
  acquiring, from map data about the region to be surveyed and mapped that is currently displayed in the human-computer interaction interface, a geographic location coordinate matching the screen location point as the reference photographing location point.

Optionally, the detecting a touch operation performed by a user in a human-computer interaction interface and determining a screen location point based on the touch operation includes at least one of the following:
  determining a point touched by the user as the screen location point if it is detected that the touch operation performed by the user is a single-point touch operation;
  selecting a point from a line segment generated by the touch operation performed by the user as the screen location point if it is detected that the touch operation performed by the user is a stroke touch operation; and
  selecting a point inside a box generated by the touch operation performed by the user as the screen location point if it is detected that the touch operation performed by the user is a box-drawing touch operation.

Optionally, the acquiring a reference photographing location point corresponding to a region to be surveyed and mapped comprises:

acquiring a central point of the region to be surveyed and mapped as the reference photographing location point.

Optionally, the acquiring a reference photographing location point corresponding to a region to be surveyed and mapped comprises:

sending location query information to the unmanned aerial vehicle for surveying and mapping, and using a geographic location coordinate fed back by the unmanned aerial vehicle for surveying and mapping as the reference photographing location point;

wherein the unmanned aerial vehicle for surveying and mapping is pre-arranged at a location matching the region to be surveyed and mapped.

Optionally, the acquiring a reference photographing location point corresponding to a region to be surveyed and mapped comprises:

acquiring a geographic location coordinate inputted by a user as the reference photographing location point.

Optionally, the establishing a mapping relation between one shooting point in a combined shooting point set and the reference photographing location point comprises:

establishing a mapping relation between the reference photographing location point and one shooting point selected by a user from the combined shooting point set.

Optionally, the establishing a mapping relation between one shooting point in a combined shooting point set and the reference photographing location point comprises:

establishing a mapping relation between the central shooting point in the combined shooting point set and the reference photographing location point.

Optionally, the establishing a mapping relation between one shooting point in a combined shooting point set and the reference photographing location point comprises:

calculating a distance between the reference photographing location point and each of key positioning points in the region to be surveyed and mapped, wherein the key positioning points include: corner points of the region to be surveyed and mapped and a central point of the region to be surveyed and mapped;

acquiring a key positioning point closest to the reference photographing location point as a target reference point; and selecting, based on location information on the target reference point in the region to be surveyed and mapped, one shooting point matching the location information from the combined shooting point set, and establishing a mapping relation between the shooting point and the reference photographing location point.

Optionally, before the determining a plurality of auxiliary photographing location points corresponding to the reference photographing location point based on the mapping relation and the preset relative positional relation between each two shooting points in the combined shooting point set, the method further comprises:

acquiring a photographing parameter of a photographing device carried by the unmanned aerial vehicle for surveying and mapping, wherein the photographing parameter includes a single-photo photographable region of the unmanned aerial vehicle for surveying and mapping at a set flying height, and each shooting point is corresponding to a single-photo photographable region; and determining the preset relative positional relation between each two shooting points in the combined shooting point set based on a preset photo overlap degree index and the single-photo photographable region;

wherein the using the reference photographing location point and the plurality of auxiliary photographing location points as sample points for surveying and mapping based on which an unmanned aerial vehicle for surveying and mapping performs surveying and mapping in the region to be surveyed and mapped comprises:

using the reference photographing location point and the plurality of auxiliary photographing location points as sample points for surveying and mapping based on which the unmanned aerial vehicle for surveying and mapping performs surveying and mapping in the region to be surveyed and mapped at the set flying height.

Optionally, the determining the preset relative positional relation between each two shooting points in the combined shooting point set based on a preset photo overlap degree index and the single-photo photographable region comprises:

determining a single-photo size based on a frame size of the photographing device and a pixel width of the photographing device;

constructing a two-dimensional coordinate system, and selecting a target point in the two-dimensional coordinate system as a central shooting point;

generating a central photo in the two-dimensional coordinate system based on the central shooting point and the single-photo size;

generating, at an upper left corner, a lower left corner, an upper right corner, and a lower right corner of the central photo, four respective peripheral photos that meet the photo overlap degree index relative to the central photo;

determining, based on a mapping relation between the single-photo size and the single-photo photographable region, a coordinate value of the respective peripheral shooting point corresponding to each peripheral photos in the two-dimensional coordinate system; and determining the preset relative positional relations between the individual shooting points in the combined shooting point set based on the coordinates values of the central shooting point and all the peripheral shooting points in the two-dimensional coordinate system.

Optionally, before the acquiring a photographing parameter of a photographing device carried by the unmanned aerial vehicle for surveying and mapping, the method further comprises:

calculating the set flying height based on a pixel width of the photographing device, a lens focal length of the photographing device, and a ground pixel resolution.

Optionally, the acquiring a photographing parameter of a photographing device carried by the unmanned aerial vehicle for surveying and mapping comprises:

calculating, based on a pixel width of the photographing device, a frame size of the photographing device, and a ground pixel resolution, a single-photo photographable region of the unmanned aerial vehicle for surveying and mapping at the set flying height.

Optionally, after the using the reference photographing location point and the plurality of auxiliary photographing location points as sample points for surveying and mapping based on which an unmanned aerial vehicle for surveying and mapping performs surveying and mapping in the region to be surveyed and mapped, the method further comprises:

sending each of the sample points for surveying and mapping to the unmanned aerial vehicle for surveying and mapping, so that a set of photos for surveying and mapping corresponding to the region to be surveyed and mapped are taken by the unmanned aerial vehicle for surveying and mapping when it flies to each of the sample points for surveying and mapping according to the flying height;

wherein all the photos in the set of photos for surveying and mapping are configured to be synthesized into an image for surveying and mapping that matches the region to be surveyed and mapped.

An embodiment of the present disclosure further provides an apparatus for planning sample points for surveying and mapping, comprising:

a mapping relation establishing module configured to acquire a reference photographing location point corresponding to a region to be surveyed and mapped, and establish a mapping relation between one shooting point in a combined shooting point set and the reference photographing location point;

an auxiliary photographing location point determining module configured to determine a plurality of auxiliary photographing location points corresponding to the reference photographing location point based on the mapping relation and a preset relative positional relation between each two shooting points in the combined shooting point set; and a module for determining sample points for surveying and mapping configured to use the reference photographing location point and the plurality of auxiliary photographing location points as sample points for surveying and mapping based on which an unmanned aerial vehicle for surveying and mapping performs surveying and mapping in the region to be surveyed and mapped.

An embodiment of the present disclosure further provides a control terminal configured to control an unmanned aerial vehicle, the control terminal comprising:

one or more processors;

a storage apparatus configured to store one or more programs;

the one or more programs, when executed by the one or more processors, causing the one or more processors to implement a method for planning sample points for surveying and mapping according to any of the embodiments of the present disclosure.

An embodiment of the present disclosure further provides a computer storage medium on which a computer program is stored, wherein a method for planning sample points for surveying and mapping according to any of the embodiments of the present disclosure is implemented when the program is executed by a processor.

DETAILED DESCRIPTION OF EMBODIMENTS

The present disclosure will be described in further detail below with reference to the accompanying drawings and embodiments. It can be understood that the embodiments described herein are merely intended to illustrate the present disclosure and are not intended to limit the present disclosure.

Only some, but not all, of the contents related to the present disclosure are shown in the drawings for ease of description. it should be noted, prior to a more detailed discussion of exemplary embodiments, that some exemplary embodiments are described as processes or methods which are depicted as flowcharts. Although the flowcharts may describe the operations (or steps) as a sequential processing, many of the operations may be carried out in parallel, concurrently or simultaneously. In addition, the order of the operations may be rearranged. The processing may be terminated when its operations are completed, but could have additional steps not included in the figure. The processing may correspond to a method, a function, a procedure, a subroutine, a subprogram, etc.

First Embodiment

Figure 1A:
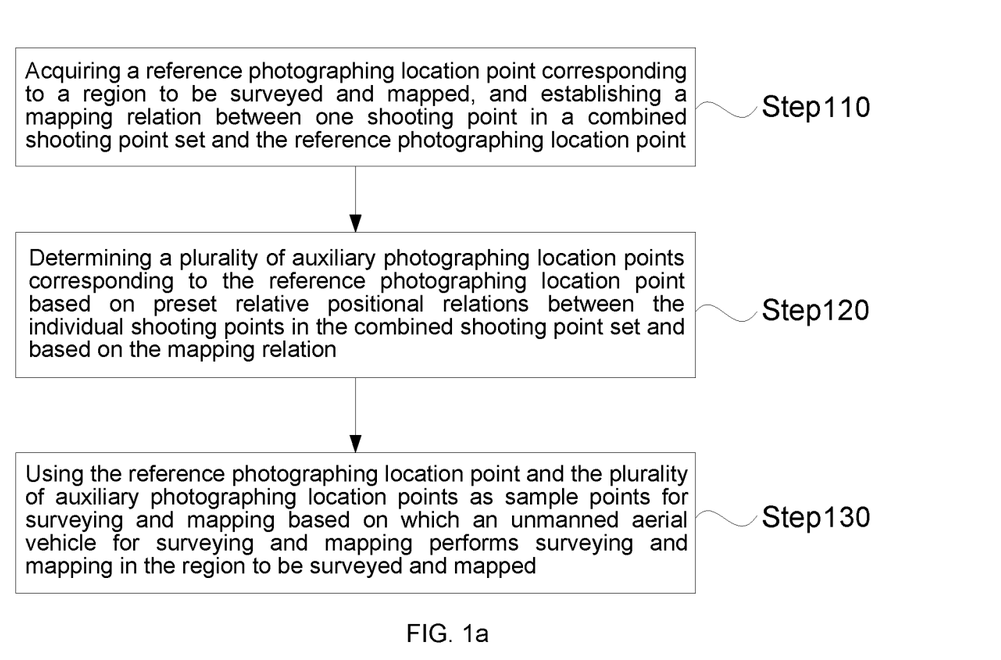
FIG. 1a is a flowchart of a method for planning sample points for surveying and mapping according to a first embodiment of the present disclosure.

FIG. 1a is a flowchart of a method for planning sample points for surveying and mapping according to a first embodiment of the present disclosure. This embodiment is applicable to a case where each of sample points for surveying and mapping in a region to be surveyed and mapped is efficiently acquired, the method may be executed by an apparatus for planning sample points for surveying and mapping, and the apparatus may be implemented by means of software and/or hardware, and may generally be integrated in a control device (e.g., a UAV remote controller) and used in cooperation with an unmanned aerial vehicle for surveying and mapping that is responsible for aerial photography. Correspondingly, as shown in FIG. 1a, the method comprises the following operations:

Step 110: acquiring a reference photographing location point corresponding to a region to be surveyed and mapped, and establishing a mapping relation between one shooting point in a combined shooting point set and the reference photographing location point.

Here, the region to be surveyed and mapped is a region having clear latitude and longitude ranges, and may be a region with any shape and any size. The shape and size of the region to be surveyed and mapped are not limited in the embodiment of the present disclosure. The reference photographing location point is a location point in the region to be surveyed and mapped, which has a matching geographical location coordinate. The location point described above may be selected by a user from the region to be surveyed and mapped (for example, by clicking, or directly inputting latitude and longitude, or the like), or may be automatically determined based on the regional shape of the region to be surveyed and mapped (the location point may be, for example, a central point of the region to be surveyed and mapped, or a corner point of the region to be surveyed and mapped, or the like).

The combined shooting point set may be a set of shooting points which are preset based on a preset distribution rule, in which a plurality of shooting points may be included, and each two shooting points have relative direction and relative distance relations therebetween. For example, the combined shooting point set includes five shooting points, which are located at the center and the four vertices of a rectangle, respectively. Here, a relative distance between each vertex and the central point is 100 m. For another example, each vertex is located in one of the four directions of east, south, west, and north, respectively. In the embodiment of the present disclosure, all the sample points for surveying and mapping which are corresponding to the region to be surveyed and mapped may be acquired with the assistance of the combined shooting point set. Optionally, one of the points in the region to be surveyed and mapped may be firstly determined as a reference photographing location point, and then a mapping relation is established between the reference photographing location point and one of the shooting points in the combined shooting point set.

In other words, each two shooting points in the combined shooting point set have a determined relative positional relation therebetween, but a correspondence relation is not established between the shooting points and the actual geographical location information, therefore the shooting points cannot be directly mapped into the actual region to be surveyed and mapped. As long as actual geographical location information on one shooting point in the combined shooting point set is given, the geographical location information on all the shooting points in the combined shooting point set can be determined and obtained.

Typically, there are overlapping regions between a plurality of photos taken according to the plurality of shooting points in the combined shooting point set. Correspondingly, after a plurality of photos are taken according to the plurality of shooting points in the combined shooting point set, the plurality of photos may be combined and/or stitched to form a complete combined region. The combined region may completely cover the region to be surveyed and mapped, or may cover only a part of the region to be surveyed and mapped, which is not limited in this embodiment.

Step 120: determining, based on the mapping relation and on the preset relative positional relation between each two shooting points in the combined shooting point set, a plurality of auxiliary photographing location points corresponding to the reference photographing location point.

Here, the auxiliary photographing location points may be other location points in the region to be surveyed and mapped that are different from the reference photographing location point.

Further, after a mapping relation between the reference photographing location point and one of the shooting points in the combined shooting point set is determined, a plurality of other auxiliary photographing location points corresponding to the reference photographing location point may be further determined based on the determined mapping relation and on the preset relative positional relation between each two shooting points in the combined shooting point set.

Exemplarily, assuming that a total of five shooting points are included in the combined shooting point set with a mapping relation being established between a central shooting point in the shooting point set and the reference photographing location point, the other four auxiliary photographing location points corresponding to the reference photographing location point may be determined based on the positional relations between the other four shooting points and the central shooting point in the combined shooting point set.

Figure 1B:
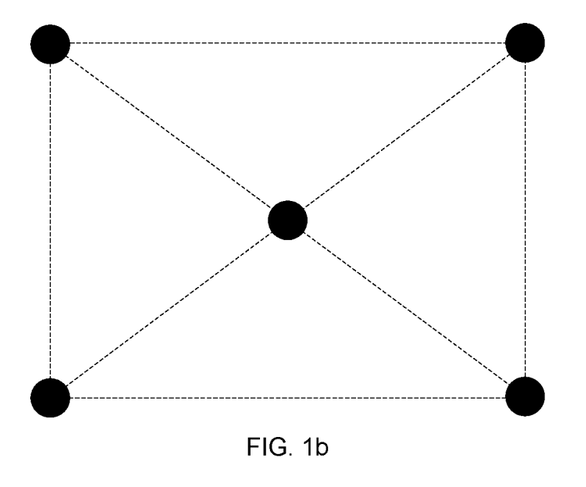
FIG. 1b is a schematic diagram showing a positional distribution of each shooting point in a combined shooting point set according to the first embodiment of the present disclosure.

FIG. 1b is a schematic diagram showing a positional distribution of each shooting point in a combined shooting point set according to the first embodiment of the present disclosure. In an optional embodiment of the present disclosure, as shown in FIG. 1b, the shooting points in the combined shooting point set include: a central shooting point and four peripheral shooting points, the peripheral shooting points are four vertices of a rectangle centered at the central shooting point; wherein a composite photo obtained by shooting based on all the shooting points in the combined shooting point set is of a rectangular shape.

In the embodiment of the present disclosure, optionally, as shown in FIG. 1b, the combined shooting point set may include five shooting points, which are a central shooting point and four peripheral shooting points, respectively. Here, the central shooting point may be a center of a rectangle, and correspondingly, the peripheral shooting points may be four vertices of the rectangle corresponding to the central shooting point. There is a certain positional relation between each two shooting points, and the positional relation should be set to satisfy such a condition that a complete rectangular photo can be obtained when all the photos taken at the respective photographing location points determined from all the shooting points are combined. Here, the combination process is performed by covering all the photos according to the overlapping images between one another. In other embodiments, after the default mapping is completed, each of the auxiliary photographing location points may be rotated around the reference photographing location point based on an operation performed by the user, or may be moved based on an operation such as a swipe operation performed by the user.

In the related art, in the formation of surveying and mapping points corresponding to a region to be surveyed and mapped, it should be ensured that there should be a preset degree of overlap between a photo taken at one surveying and mapping point and all photos taken at other shooting points at positions horizontally and vertically adjacent to the photo, because mobile surveying and mapping is to be performed in the region to be surveyed and mapped in a traversal manner along parallel lines. As a result, a photo for surveying and mapping contains a small amount of information different from that contained in other photos for surveying and mapping, therefore it is necessary to take a large number of photos to complete the surveying and mapping of a region to be surveyed and mapped, and a large amount of work and time is required for synthesis and stitching of the photos in the later stage. In this embodiment, the selected five shooting points in the combined shooting point set are one central shooting point and four peripheral shooting points, it is sufficient as long as it can be ensured that each peripheral shooting point meets the above required degree (e.g., 60% or 70% or the like) of overlap relative to the central shooting point, while each two peripheral shooting points are not required to meet such a high degree of overlap therebetween. This greatly reduces the total number of photos for surveying and mapping that need to be taken in the surveying and mapping of a region to be surveyed and mapped having a fixedly size, whereby the time and hardware cost required for synthesis or stitching of the photos in the later stage can be greatly reduced. In particular, if the solution of the embodiment of the present disclosure is applied to a small plot of land, for example, when a plot of land can be completely covered after a plurality of photos taken at all the shooting points in a combined shooting point set are combined or stitched, the solution of the embodiment of the present disclosure can be significantly superior to the surveying and mapping at selected points in a traversal manner along parallel lines in relevant techniques in the prior art, in terms of the number of surveying and mapping points and the difficulty of the stitching in the later stage.

Step 130, using the reference photographing location point and the plurality of auxiliary photographing location points as sample points for surveying and mapping based on which an unmanned aerial vehicle for surveying and mapping performs surveying and mapping in the region to be surveyed and mapped.

Correspondingly, upon the reference photographing location point and each auxiliary photographing location point are obtained, the reference photographing location point and the auxiliary photographing location points may be used as sample points for surveying and mapping based on which an unmanned aerial vehicle for surveying and mapping performs surveying and mapping in the region to be surveyed and mapped. The unmanned aerial vehicle for surveying and mapping may perform aerial photography based on each of the sample points for surveying and mapping, and send the photos obtained by aerial photography to a corresponding control terminal or ground terminal, so that the control terminal can synthesize the acquired photos to obtain a final image for surveying and mapping. Optionally, the unmanned aerial vehicle for surveying and mapping may implement the synthesis of multiple photos locally because the solution of the embodiment of the present disclosure can greatly reduce the number of photos for surveying and mapping to be taken.

For the photos acquired corresponding to all the sample points for surveying and mapping obtained by the method for planning sample points for surveying and mapping according to the embodiment of the present disclosure, each successive two photos are not required to have a certain degree of overlap therebetween, therefore the time consumed by processing of image data can be greatly reduced.

In the embodiment of the present disclosure, a reference photographing location point corresponding to a region to be surveyed and mapped is acquired, a mapping relation is established between one shooting point in a combined shooting point set and the reference photographing location point, and at the same time a plurality of auxiliary photographing location points corresponding to the reference photographing location point are determined based on the mapping relation and the preset relative positional relation between each two shooting points in the combined shooting point set, and then the reference photographing location point and the plurality of auxiliary photographing location points are used as the sample points for surveying and mapping based on which an unmanned aerial vehicle for surveying and mapping performs surveying and mapping in the region to be surveyed and mapped. In this way, a new method for planning sample points for surveying and mapping is proposed, and the prior parallel-line-based mobile planning mode is replaced with an overall planning of multiple surveying and mapping points based on a combined shooting point set, so that the problems of high cost and low surveying and mapping efficiency existing in the prior UAV-based aerial survey methods are solved, and the technical effects of reducing the surveying and mapping cost and improving the surveying and mapping efficiency are achieved.

Second Embodiment

Figure 2:
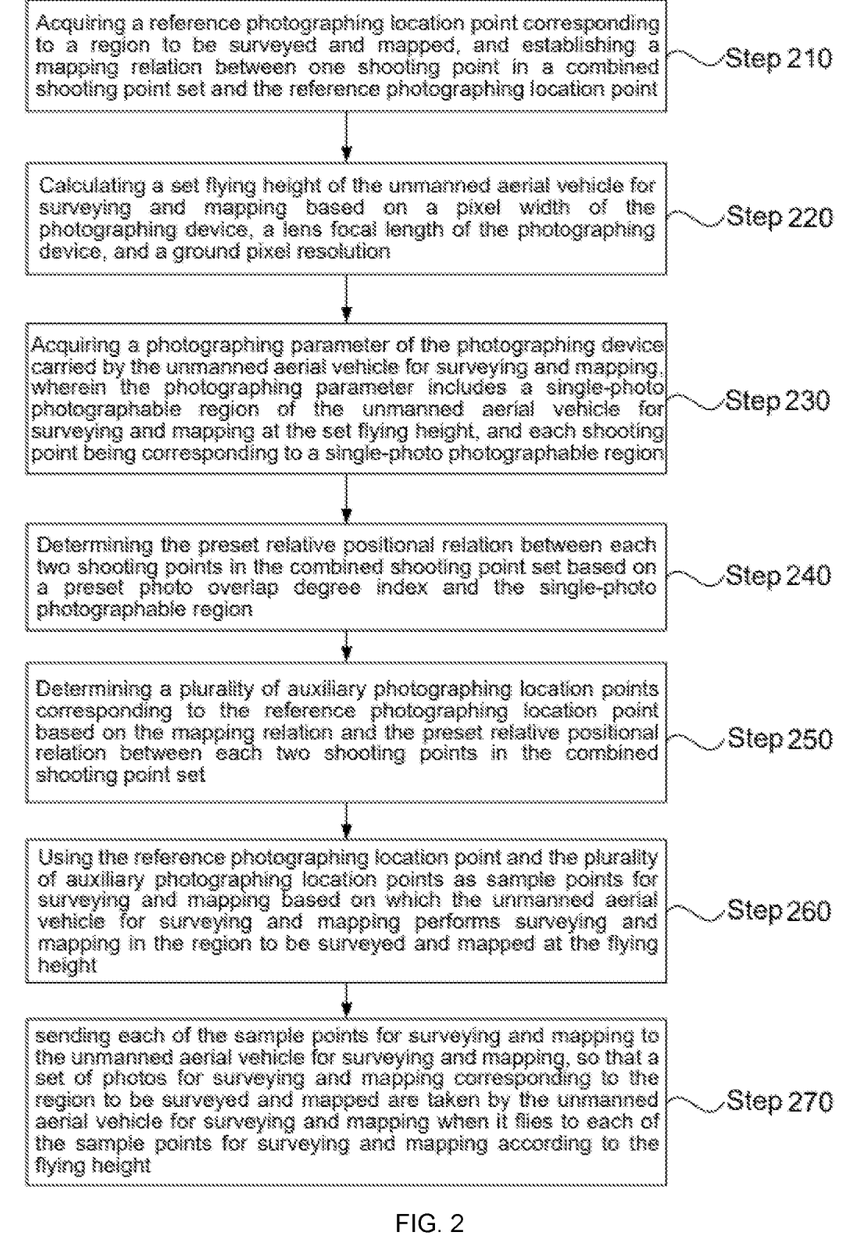
FIG. 2 is a flowchart of a method for planning sample points for surveying and mapping according to a second embodiment of the present disclosure.

FIG. 2 is a flowchart of a method for planning sample points for surveying and mapping according to a second embodiment of the present disclosure. This embodiment is described in detail on the basis of the foregoing embodiment. In this embodiment, multiple implementation modes are given, which are used for the acquisition of a reference photographing location point corresponding to a region to be surveyed and mapped and the establishment of a mapping relation between one shooting point in a combined shooting point set and the reference photographing location point, and operations to be completed prior to the determination of a plurality of auxiliary photographing location points corresponding to the reference photographing location point are also given. Correspondingly, as shown in FIG. 2, the method in this embodiment may comprise the following steps:

Step 210: acquiring a reference photographing location point corresponding to a region to be surveyed and mapped, and establishing a mapping relation between one shooting point in a combined shooting point set and the reference photographing location point.

In an optional embodiment of the present disclosure, the acquiring a reference photographing location point corresponding to a region to be surveyed and mapped may comprise: detecting a touch operation performed by a user in a human-computer interaction interface, and determining a screen location point based on the touch operation; and acquiring, from map data about the region to be surveyed and mapped that is currently displayed in the human-computer interaction interface, a geographic location coordinate matching the screen location point as the reference photographing location point.

In the embodiment of the present disclosure, the reference photographing location point may be determined from a point specified by the user in the human-computer interaction interface. Optionally, a touch operation, such as a clicking or sliding operation or the like, performed by the user in the human-computer interaction interface may be detected, and one of the screen location points in the human-computer interaction interface is determined based on the touch operation performed by the user. Then, a geographic location coordinate matching the screen location point is determined as the reference photographing location point based on map data about the region to be surveyed and mapped that is currently displayed in the human-computer interaction interface. Here, the map data may be latitude and longitude information or the like.

In an optional embodiment of the present disclosure, the detecting a touch operation performed by a user in a human-computer interaction interface and determining a screen location point based on the touch operation may comprise at least one of the following:

determining a point touched by the user as the screen location point if it is detected that the touch operation performed by the user is a single-point touch operation;

selecting a point from a line segment generated by the touch operation performed by the user as the screen location point if it is detected that the touch operation performed by the user is a stroke touch operation; and selecting a point inside a box generated by the touch performed by the user as the screen location point if it is detected that the touch operation performed by the user is a box-drawing touch operation.

In the embodiment of the present disclosure, the determination of a screen location point based on a touch operation performed by a user in the human-computer interaction interface may be specifically implemented in multiple manners. Optionally, a touch point corresponding to a single-point touch operation performed by the user may be determined as the screen location point. A point on a line segment generated by a stroke touch operation performed by the use may also be used as the screen location point. For example, a midpoint of the line segment may be used as the screen location point. A point inside a box generated by a box-drawing touch operation performed by the user may also be used as the screen location point, and for example, a central point of the box may be used as the screen location point.

In an optional embodiment of the present disclosure, the acquiring a reference photographing location point corresponding to a region to be surveyed and mapped may further comprise: acquiring a central point of the region to be surveyed and mapped as the reference photographing location point.

In addition, in the embodiment of the present disclosure, the reference photographing location point may also be automatically generated by a control terminal that controls an unmanned aerial vehicle for surveying and mapping. For example, a central point of the region to be surveyed and mapped where the unmanned aerial vehicle for surveying and mapping is positioned is directly used as the reference photographing location point.

In an optional embodiment of the present disclosure, the acquiring a reference photographing location point corresponding to a region to be surveyed and mapped may further comprise: sending location query information to the unmanned aerial vehicle for surveying and mapping, and using a geographic location coordinate fed back by the unmanned aerial vehicle for surveying and mapping as the reference photographing location point; wherein the unmanned aerial vehicle for surveying and mapping is pre-arranged at a location matching the region to be surveyed and mapped.

Further, before sending the location query information to the unmanned aerial vehicle for surveying and mapping, the method may further comprise: receiving at least one flight control instruction inputted by the user for the unmanned aerial vehicle for surveying and mapping, and sending the flight control instruction to the unmanned aerial vehicle for surveying and mapping; sending a hovering instruction to the unmanned aerial vehicle for surveying and mapping to control the unmanned aerial vehicle for surveying and mapping to hover at a current location when it is confirmed that a location confirmation response inputted by the user is received; wherein the flight control instruction controls the unmanned aerial vehicle for surveying and mapping to move in the air in a set direction and/or by a set distance.

In the embodiment of the present disclosure, the reference photographing location point may also be determined by location information specified by the user. Optionally, the user may send location query information to the unmanned aerial vehicle for surveying and mapping via the control terminal. For example, the user triggers a set identifier in the human-computer interaction interface of the control terminal to send location query information to the unmanned aerial vehicle for surveying and mapping to query about the current location of the unmanned aerial vehicle for surveying and mapping. After receiving the location query information, the unmanned aerial vehicle for surveying and mapping acquires the current geographic location coordinate via its own positioning apparatus and feeds back the current geographic location coordinate to the control terminal. The control terminal may directly use a location point corresponding to the received geographic location coordinate as the reference photographing location point. Correspondingly, a ground projection point of the unmanned aerial vehicle for surveying and mapping should be located inside the region to be surveyed and mapped, when sending the geographic location coordinate to the control terminal.

In an optional embodiment of the present disclosure, the acquiring a reference photographing location point corresponding to a region to be surveyed and mapped may further comprise: acquiring a geographic location coordinate inputted by the user as the reference photographing location point.

In the embodiment of the present disclosure, the geographic location coordinate inputted by the user may be directly used as the reference photographing location point. Optionally, the user may input the geographic location coordinate by means of a soft keyboard in the human-computer interaction interface, a numeric keypad in the control terminal, voice input, or the like.

In an optional embodiment of the present disclosure, the establishing a mapping relation between one shooting point in a combined shooting point set and the reference photographing location point may comprise: establishing a mapping relation between one shooting point selected by the user from the combined shooting point set and the reference photographing location point.

Correspondingly, after the reference photographing location point is acquired, the user may arbitrarily select one shooting point from all the shooting points in the combined shooting point set, and a mapping relation is established between the shooting point in the combined shooting point set selected by the user and the reference photographing location point.

In an optional embodiment of the present disclosure, the establishing a mapping relation between one shooting point in a combined shooting point set and the reference photographing location point may further comprise: establishing a mapping relation between the central shooting point in the combined shooting point set and the reference photographing location point.

In the embodiment of the present disclosure, optionally, a mapping relation may be established directly between the central shooting point in the combined shooting point set and the reference photographing location point.

In an optional embodiment of the present disclosure, the establishing a mapping relation between one shooting point in a combined shooting point set and the reference photographing location point may further include: calculating a distance between the reference photographing location point and each of key positioning points in the region to be surveyed and mapped, wherein the key positioning points includes: corner points of the region to be surveyed and mapped and a central point of the region to be surveyed and mapped; acquiring a key positioning point closest to the reference photographing location point as a target reference point; selecting, based on location information on the target reference point in the region to be surveyed and mapped, one shooting point matching the location information from the combined shooting point set, and establishing a mapping relation between the shooting point and the reference photographing location point.

In the embodiment of the present disclosure, optionally, the mapping relation may also be determined based on a distance relation between the reference photographing location point and each of key positioning points in the region to be surveyed and mapped. The corner points of the region to be surveyed and mapped and the central point of the region to be surveyed and mapped are used as the key positioning points, a distance between the reference photographing location point and each of the key positioning points of the region to be surveyed and mapped is calculated, and a key positioning point closest to the reference photographing location point is acquired as a target reference point. Then, based on location information on the target reference point in the region to be surveyed and mapped, one shooting point matching the location information is selected from the combined shooting point set, and a mapping relation is established between the shooting point and the reference photographing location point. For example, if the target reference point is located in the upper left part of the region to be surveyed and mapped, one shooting point at the upper left corner may be selected from the combined shooting point set, and a mapping relation is established between the shooting point and the reference photographing location point.

Step 220: Calculated a set flying height of the unmanned aerial vehicle for surveying and mapping based on a pixel width of a photographing device, a lens focal length of the photographing device, and a ground pixel resolution.

It can be understood that when a photographing device such as a camera of the unmanned aerial vehicle for surveying and mapping has fixed photographing parameters, the flying height of the unmanned aerial vehicle for surveying and mapping directly influences the ground pixel resolution. The ground pixel resolution, in turn, directly determines an area of the region to be surveyed and mapped that can be covered by a single photo. Therefore, before the region to be surveyed and mapped is aerially photographed using the unmanned aerial vehicle for surveying and mapping, the set flying height of the unmanned aerial vehicle for surveying and mapping should be first determined. The set flying height of the unmanned aerial vehicle for surveying and mapping may be calculated based on the pixel width of the photographing device, the lens focal length of the photographing device, and the ground pixel resolution. Optionally, a formula where the flying height=the ground pixel resolution*the lens focal length/the pixel width may be obtained from a formula where the ground pixel resolution=the flying height*the pixel width/the lens focal length. Here, the pixel width=a width dimension of a sensor of the photographing device/a frame width.

Step 230: acquiring a photographing parameter of the photographing device carried by the unmanned aerial vehicle for surveying and mapping, wherein the photographing parameter include a single-photo photographable region (a region photographable in a single photo) by the unmanned aerial vehicle for surveying and mapping at the set flying height, and each shooting point is corresponding to a single-photo photographable region.

Here, the single-photo photographable region is an actual region to be surveyed and mapped that can be captured in a single photo.

In the embodiment of the present disclosure, since it is necessary to synthesize the photos acquired by the unmanned aerial vehicle for surveying and mapping to obtain a final image for surveying and mapping, it is necessary to determine a single-photo photographable region of the unmanned aerial vehicle for surveying and mapping at the set flying height so as to determine the preset relative positional relation between each two shooting points in the combined shooting point set based on the size of the single-photo photographable region. Each shooting point is corresponding to a single-photo photographable region, and for example, the shooting point is the midpoint or one of the vertices of the single-photo photographable region.

In an optional embodiment of the present disclosure, the a acquiring photographing parameter of the photographing device carried by the unmanned aerial vehicle for surveying and mapping may comprise: calculating the single-photo photographable region of the unmanned aerial vehicle for surveying and mapping at the set flying height based on the pixel width of the photographing device, a frame size of the photographing device, and the ground pixel resolution.

In the embodiment of the present disclosure, further, the single-photo photographable region of the unmanned aerial vehicle for surveying and mapping at the set flying height may be calculated based on the pixel width of the photographing device, a frame size of the photographing device, and the ground pixel resolution. Optionally, the single-photo photographable region=the ground pixel resolution*the frame size, and the ground pixel resolution=the flying height*the pixel width/the lens focal length.

Namely, a length photographable in a single photo=the ground pixel resolution*the frame length; and a width photographable in a single photo=the ground pixel resolution*the frame width. For example, if the frame size is 3456*4608 and the ground pixel resolution is 0.05 m, the single-photo photographable region is 172.8 m*230.4 m.

Step 240: determining the preset relative positional relation between each two shooting points in the combined shooting point set based on a preset photo overlap degree index and the single-photo photographable region.

Here, the preset photo overlap degree index may be an overlap degree index set based on an actual requirement, such as 50%, 60%, 70%, or the like. Although the numerical value of the preset photo overlap degree index is not limited in the embodiment of the present disclosure, the preset photo overlap degree index should meet the requirement that a complete rectangle can be formed when all the photos are synthesized according to the overlapping portions.

Correspondingly, in the embodiment of the present disclosure, the preset relative positional relation between each two shooting points in the combined shooting point set may be determined based on the preset photo overlap degree index and the single-photo photographable region.

In an optional embodiment of the present disclosure, the determining the preset relative positional relation between each shooting points in the combined shooting point set based on a preset photo overlap degree index and the single-photo photographable region may comprise:

determining a single-photo size based on a frame size of the photographing device and a pixel width of the photographing device;

constructing a two-dimensional coordinate system, and selecting a target point as a central shooting point from the two-dimensional coordinate system;

generating a central photo in the two-dimensional coordinate system based on the central shooting point and the single-photo size;

generating, at an upper left corner, a lower left corner, an upper right corner, and a lower right corner of the central photo, four respective peripheral photos that meet the photo overlap degree index relative to the central photo;

determining, based on a mapping relation between the single-photo size and the single-photo photographable region, a coordinate value of each peripheral shooting point corresponding to the respective peripheral photo in the two-dimensional coordinate system; and determining the preset relative positional relations between each two shooting points in the combined shooting point set based on the coordinates values of the central shooting point and all the peripheral shooting points in the two-dimensional coordinate system.

Here, the target point may be any point in the two-dimensional coordinate system. For example, the target point may be the origin of the two-dimensional coordinate system.

Optionally, in the determination of the preset relative positional relations between each two shooting points in the combined shooting point set, a single-photo size may be first determined based on the frame size of the photographing device and the pixel width of the photographing device.

Here, the single-photo size=frame size*pixel width (namely, a single-photo length=frame length*pixel width; and a single photo-width=frame width*pixel width). Then, a target point is selected in the two-dimensional coordinate system as the central shooting point of the combined shooting point set. Further, a central photo is generated in the two-dimensional coordinate system based on the central shooting point and the single-photo size. For example, a corresponding central photo is generated using the central shooting point as the central point of the central photo and based on the single-photo size. Then, based on the single-photo size and the photo overlap degree, four respective peripheral photos matching the central photo may be generated index in four orientations, i.e., the upper left corner, the lower left corner, the upper right corner, and the lower right corner of the central photo. Each of the central photo and the four peripheral photos matching therewith is not a photo taken in real sense, but is a rectangular region with the same size and shape as a single photo. Correspondingly, after the central photo and the four peripheral photos matching therewith are acquired, a coordinate value of respective peripheral shooting points corresponding to each peripheral photo in the two-dimensional coordinate system may be determined based on a mapping relation between the single-photo size and the single-photo photographable region. For example, if the single-photo size is 10 cm*10 cm, the photo overlap degree index is 50%, the peripheral photos corresponding to the upper left corner, the lower left corner, the upper right corner, and the lower right corner are respectively corresponding to regions photographable in single photos at the upper left corner, the lower left corner, the upper right corner, and the lower right corner, and a mapping relation between the single-photo size and the single-photo photographable region is 1:200, then the single-photo photographable region is correspondingly 20 m*20 m. If the central points of the peripheral photos are used as the respective peripheral shooting points and the coordinate origin is used as the central shooting point, the respective peripheral shooting points may have coordinate values of (−10, 10), (−10, −10), (10, 10), and (10,−10) in unit of m, respectively. Correspondingly, upon the respective coordinate value corresponding to each peripheral shooting point is obtained, the preset relative positional relations between each two shooting points in the combined shooting point set may be determined based on the coordinate values of the central shooting point and all the peripheral shooting points in the two-dimensional coordinate system. For example, in the above example, there is a relative distance of 20 m between the peripheral shooting points located at the individual vertices in the combined shooting point set, and there is a relative distance of $10\sqrt{2}m$ m between the central shooting point at the central point and each peripheral shooting point.

Step 250: determining a plurality of auxiliary photographing location points corresponding to the reference photographing location point based on the mapping relation and the preset relative positional relation between each two shooting points in the combined shooting point set.

In an optional example, it is assumed that there is a relative distance of 20 m between the peripheral shooting points located at the individual vertices in the combined shooting point set, and there is a relative distance of $10\sqrt{2}m$ m between the central shooting point at the central point and each peripheral shooting point. A mapping relation is established between the central shooting point and the reference photographing location point, then there is a relative distance of 20 m between the other auxiliary photographing location points, and there is a relative distance of $10\sqrt{2}m$ m between each auxiliary photographing location point and the reference photographing location point.

Step 260: using the reference photographing location point and the plurality of auxiliary photographing location points as sample points for surveying and mapping based on which the unmanned aerial vehicle for surveying and mapping performs surveying and mapping in the region to be surveyed and mapped at the flying height.

Correspondingly, in the embodiment of the present disclosure, the obtained reference photographing location point and the plurality of auxiliary photographing location points may be used as sample points for surveying and mapping corresponding to the set flying height of the unmanned aerial vehicle for surveying and mapping.

Step 270: sending each of the sample points for surveying and mapping to the unmanned aerial vehicle for surveying and mapping, so that a set of photos for surveying and mapping corresponding to the region to be surveyed and mapped are taken by the unmanned aerial vehicle for surveying and mapping when it flies to each of the sample points for surveying and mapping according to the flying height.

Correspondingly, in the embodiment of the present disclosure, the control terminal may send the obtained sample points for surveying and mapping to the unmanned aerial vehicle for surveying and mapping, and the unmanned aerial vehicle for surveying and mapping may travel to each of the sample points for surveying and mapping according to the set flying height to photograph the region to be surveyed and mapped, whereby a set of photos for surveying and mapping are obtained. All the photos in the set of photos for surveying and mapping may be configured to be synthesized into an image for surveying and mapping that matches the region to be surveyed and mapped.

With the technical solution described above, the auxiliary photographing location points determined by using the mapping relation between the combined shooting point set and the reference photographing location point are used as the sample points for surveying and mapping based on which the unmanned aerial vehicle for surveying and mapping performs surveying and mapping in the region to be surveyed and mapped at the set flying height, and a set of photos for surveying and mapping corresponding to the region to be surveyed and mapped are acquired by using the unmanned aerial vehicle for surveying and mapping based on the determined sample points for surveying and mapping so that the photos are synthesized into an image for surveying and mapping that matches the region to be surveyed and mapped, in this way, the problems of high cost and low surveying and mapping efficiency existing in the prior UAV-based aerial survey methods are solved, a reduction in the surveying and mapping cost is achieved, and the surveying and mapping efficiency is improved.

Third Embodiment

Figure 3:
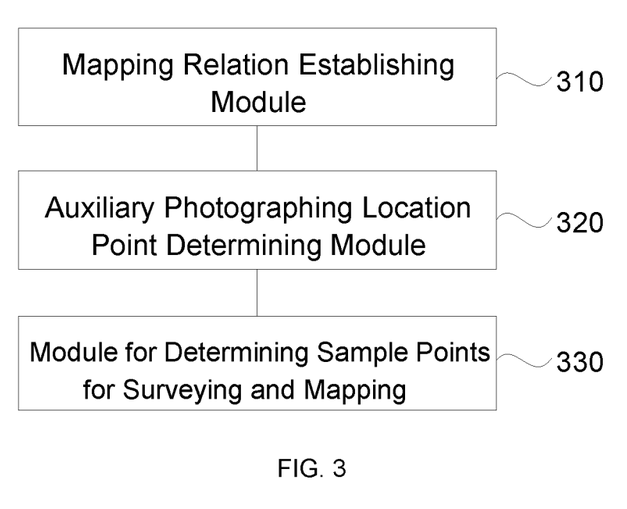
FIG. 3 is a schematic diagram of an apparatus for planning sample points for surveying and mapping according to a third embodiment of the present disclosure.

FIG. 3 is a schematic diagram of an apparatus for planning sample points for surveying and mapping according to a third embodiment of the present disclosure. As shown in FIG. 3, the apparatus comprises: a mapping relation establishing module (a module for establishing mapping relations) 310, an auxiliary photographing location point determining module (a module for determining auxiliary photographing location points) 320, and a module 330 for determining sample points for surveying and mapping, wherein the mapping relation establishing module 310 is configured to acquire a reference photographing location point corresponding to a region to be surveyed and mapped, and establish a mapping relation between one shooting point in a combined shooting point set and the reference photographing location point;

the auxiliary photographing location point determining module 320 is configured to determine a plurality of auxiliary photographing location points corresponding to the reference photographing location point based on the mapping relation and a preset relative positional relation between each two shooting points in the combined shooting point set;

the module 330 for determining sample points for surveying and mapping is configured to use the reference photographing location point and the plurality of auxiliary photographing location points as sample points for surveying and mapping based on which an unmanned aerial vehicle for surveying and mapping performs surveying and mapping in the region to be surveyed and mapped.

In the embodiment of the present disclosure, a reference photographing location point corresponding to a region to be surveyed and mapped is acquired, a mapping relation is established between one shooting point in a combined shooting point set and the reference photographing location point, and at the same time a plurality of auxiliary photographing location points corresponding to the reference photographing location point are determined based on the mapping relation and a preset relative positional relation between each two shooting points in the combined shooting point set, and then the reference photographing location point and the plurality of auxiliary photographing location points are used as sample points for surveying and mapping based on which an unmanned aerial vehicle for surveying and mapping performs surveying and mapping in the region to be surveyed and mapped. In this way, a new method for planning sample points for surveying and mapping is proposed, and the prior parallel-line-based mobile planning mode is replaced with an overall planning of multiple surveying and mapping points based on a combined shooting point set, so that the problems of high cost and low surveying and mapping efficiency existing in the prior UAV-based aerial survey methods are solved, and the technical effects of reducing the surveying and mapping cost and improving the surveying and mapping efficiency are achieved.

Optionally, the shooting points in the combined shooting point set include: a central shooting point and four peripheral shooting points, wherein the peripheral shooting points are four vertices of a rectangle centered at the central shooting point; wherein a composite photo obtained by shooting based on all the shooting points in the combined shooting point set is of a rectangular shape.

Optionally, the mapping relation establishing module 310 is configured to detect a touch operation performed by a user in a human-computer interaction interface, and determine a screen location point based on the touch operation; and acquire, from map data about the region to be surveyed and mapped that is currently displayed in the human-computer interaction interface, a geographic location coordinate matching the screen location point as the reference photographing location point.

Optionally, the mapping relation establishing module 310 is configured to determine a point touched by the user as the screen location point if it is detected that the touch operation performed by the user is a single-point touch operation;

select a point from a line segment generated by the touch operation performed by the user as the screen location point if it is detected that the touch operation performed by the user is a stroke touch operation; and select a point inside a box generated by the touch operation performed by the user as the screen location point if it is detected that the touch operation performed by the user is a box-drawing touch operation.

Optionally, the mapping relation establishing module 310 is configured to acquire a central point of the region to be surveyed and mapped as the reference photographing location point.

Optionally, the mapping relation establishing module 310 is configured to send location query information to the unmanned aerial vehicle for surveying and mapping, and use a geographic location coordinate fed back by the unmanned aerial vehicle for surveying and mapping as the reference photographing location point; wherein the unmanned aerial vehicle for surveying and mapping is pre-arranged at a location matching the region to be surveyed and mapped.

Optionally, the mapping relation establishing module 310 is configured to acquire a geographic location coordinate inputted by the user as the reference photographing location point.

Optionally, the mapping relation establishing module 310 is configured to establish a mapping relation between one shooting point selected by the user from the combined shooting point set and the reference photographing location point.

Optionally, the mapping relation establishing module 310 is configured to establish a mapping relation between the central shooting point in the combined shooting point set and the reference photographing location point.

Optionally, the mapping relation establishing module 310 is configured to calculate a distance between the reference photographing location point and each of key positioning points in the region to be surveyed and mapped, wherein the key positioning points include: corner points of the region to be surveyed and mapped and a central point of the region to be surveyed and mapped; acquire a key positioning point closest to the reference photographing location point as a target reference point; select, based on location information on the target reference point in the region to be surveyed and mapped, one shooting point matching the location information from the combined shooting point set, and establish a mapping relation between the shooting point and the reference photographing location point.

Optionally, the apparatus further comprises: a module for acquiring a single-photo photographable region, the module is configured to acquire a photographing parameter of a photographing device carried by the unmanned aerial vehicle for surveying and mapping, wherein the photographing parameter includes a single-photo photographable region of the unmanned aerial vehicle for surveying and mapping at a set flying height, and each shooting point is corresponding to a single-photo photographable region; a relative positional relation determining module, configured to determine the preset relative positional relations between each two shooting points in the combined shooting point set based on a preset photo overlap degree index and the single-photo photographable region; and the module for determining sample points for surveying and mapping, configured to use the reference photographing location point and the plurality of auxiliary photographing location points as sample points for surveying and mapping based on which the unmanned aerial vehicle for surveying and mapping performs surveying and mapping in the region to be surveyed and mapped at the flying height.

Optionally, the relative positional relation determining module is configured to determine a single-photo size based on a frame size of the photographing device and a pixel width of the photographing device; construct a two-dimensional coordinate system, and select a target point in the two-dimensional coordinate system as a central shooting point; generate a central photo in the two-dimensional coordinate system based on the central shooting point and the single-photo size; generate, at an upper left corner, a lower left corner, an upper right corner, and a lower right corner of the central photo, four respective peripheral photos that meet the photo overlap degree index relative to the central photo; determine, based on a mapping relation between the single-photo size and the single-photo photographable region, a coordinate values of the respective peripheral shooting point corresponding to each peripheral photo in the two-dimensional coordinate system; and determine the preset relative positional relation between each two shooting points in the combined shooting point set based on the coordinates values of the central shooting point and all the peripheral shooting points in the two-dimensional coordinate system.

Optionally, the apparatus further comprises a module for calculating set flying height, configured to calculate the set flying height based on a pixel width of the photographing device, a lens focal length of the photographing device, and a ground pixel resolution.

Optionally, the module for acquiring a single-photo photographable region is configured to calculate, based on the pixel width of the photographing device, the frame size of the photographing device, and the ground pixel resolution, a single-photo photographable region of the unmanned aerial vehicle for surveying and mapping at the set flying height.

Optionally, the apparatus further comprises: a module for sending sample points for surveying and mapping, configured to send each of the sample points for surveying and mapping to the unmanned aerial vehicle for surveying and mapping, so that a set of photos for surveying and mapping corresponding to the region to be surveyed and mapped are taken by the unmanned aerial vehicle for surveying and mapping when it flies to each of the sample points for surveying and mapping according to the flying height; and all the photos in the set of photos for surveying and mapping are configured to be synthesized into an image for surveying and mapping that matches the region to be surveyed and mapped.

The apparatus for planning sample points for surveying and mapping described above may execute a method for planning sample points for surveying and mapping according to any embodiment of the present disclosure, and has functional modules and advantageous effects corresponding to the execution of the method. For the technical details that are not described in detail in this embodiment, reference may be made to the method for planning sample points for surveying and mapping according to any embodiment of the present disclosure.

Fourth Embodiment

Figure 4:
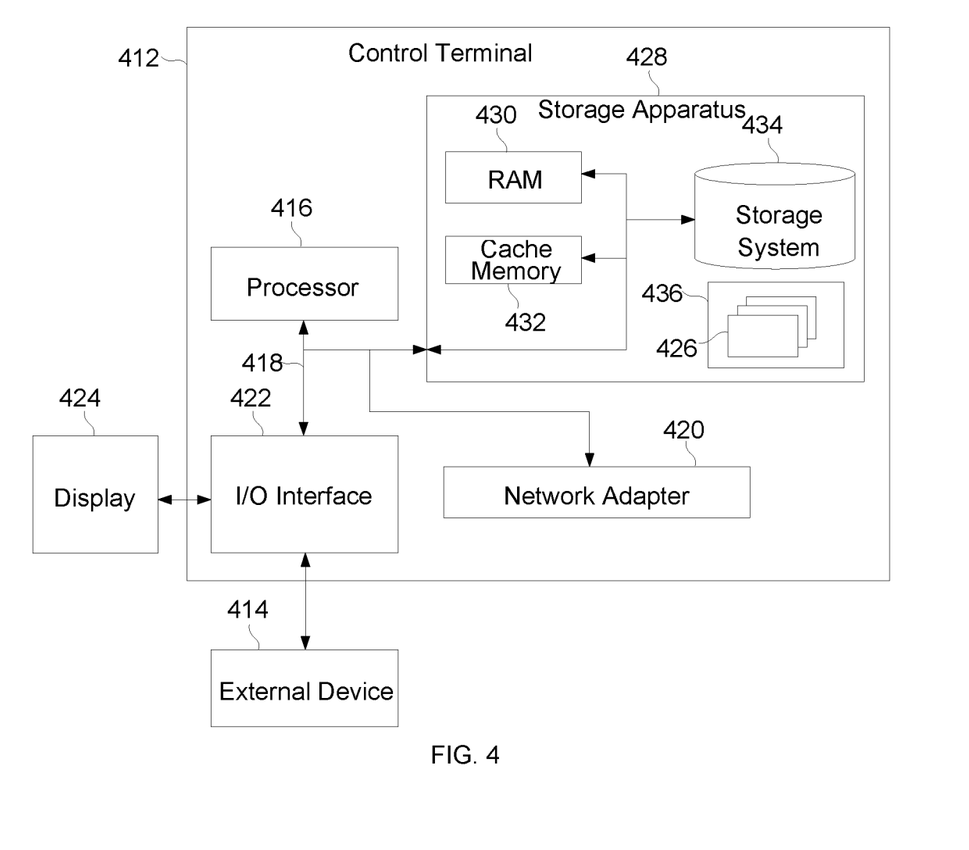
FIG. 4 is a schematic structural diagram of a control terminal configured to control an unmanned aerial vehicle according to a fourth embodiment of the present disclosure.

FIG. 4 is a schematic structural diagram of a control terminal configured to control an unmanned aerial vehicle according to a fourth embodiment of the present disclosure. FIG. 4 shows a block diagram of a control terminal 412 suitable for implementation of embodiments of the present disclosure. The control terminal 412 shown in FIG. 4 is merely an example and is not intended to limit, in any way, the functions and applicable scope of the embodiments of the present disclosure.

As shown in FIG. 4, the control terminal 412 is embodied in the form of a general-purpose computing device. The components of the control terminal 412 may include, but are not limited to, one or more processors 416, a storage apparatus 428, and a bus 418 that couples different system components (including the storage apparatus 428 and the one or more processors 416).

The bus 418 represents one or more of several types of bus structures, including a memory bus, a memory controller, a peripheral bus, an accelerated graphics port, and local bus in a processor or a bus structure using any of a variety of bus architectures. By way of example, such architectures include, but are not limited to, Industry Standard Architecture (ISA) bus, Micro Channel Architecture (MCA) bus, Enhanced ISA bus, Video Electronics Standards Association (VESA) local bus, and Peripheral Component Interconnect (PCI) bus.

The control terminal 412 typically includes a variety of computer system readable media. Such media may be any available media that are accessible by the control terminal 412, including both volatile and non-volatile media, removable and non-removable media.

The storage apparatus 428 may include computer system readable media in the form of volatile memory, such as a random access memory (RAM) 430 and/or a cache memory 432. The control terminal 412 may further include other removable/non-removable, volatile/non-volatile computer system storage media. By way of example, a storage system 434 can be provided for reading from and writing to a non-removable, non-volatile magnetic medium (not shown in FIG. 4 and typically called as a "hard drive"). Although the medium is not shown in FIG. 4, a magnetic disk drive for reading from and writing to a removable, non-volatile magnetic disk (e.g., a "floppy disk"), and an optical disk drive for reading from or writing to a removable, non-volatile optical disk such as a compact disc-read only memory (CD-ROM), a digital video disc-read only memory (DVD-ROM) or other optical media may be provided. In such cases, each drive may be connected with the bus 418 via one or more data media interfaces. The storage apparatus 428 may include at least one program product having a set (e.g., at least one) of program modules that are configured to carry out the functions of each embodiment of the present disclosure.

A program 436, having a set (at least one) of program modules 426, may be stored in the storage apparatus 428 by way of example, wherein such program modules 426 include, but are not limited to, an operating system, one or more application programs, other program modules, and program data. Each or some combination of these examples may include an implementation of a networking environment. The program modules 426 generally carry out the functions and/or methods of the embodiments described in the present disclosure.

The control terminal 412 may also communicate with one or more external devices 414 (such as a keyboard, a pointing device, a camera, a display 424, etc.), and may also communicate with one or more devices that enable a user to interact with the control terminal 412, and/or any devices (e.g., a network card, a modem, etc.) that enable the control terminal 412 to communicate with one or more other computing devices. Such communication may occur via an input/output (I/O) interface 422. Still yet, the control terminal 412 may communicate with one or more networks (such as a local area network (LAN), a wide area network (WAN), and/or a public network (e.g., the Internet)) via a network adapter 420. As shown in the figure, the network adapter 420 communicates with the other modules of the control terminal 412 via the bus 418. It should be understood that although not shown in the figure, other hardware and/or software modules could be used in conjunction with the control terminal 412, which include, but are not limited to: microcode, device drivers, redundant processing units, external disk drive arrays, redundant arrays of independent disks (RAID) systems, tape drives, data archival storage systems, etc.

The processor 416 executes the respective functional applications and data processing, for example implementation of the method for planning sample points for surveying and mapping according to the foregoing embodiments of the present disclosure, by running a program stored in the storage apparatus 428.

In other words, when executing the program, the processing unit implements operations of: acquiring a reference photographing location point corresponding to a region to be surveyed and mapped, and establishing a mapping relation between one shooting point in a combined shooting point set and the reference photographing location point; determining a plurality of auxiliary photographing location points corresponding to the reference photographing location point based on the mapping relation and the preset relative positional relation between each two shooting points in the combined shooting point set; and using the reference photographing location point and the plurality of auxiliary photographing location points as sample points for surveying and mapping based on which an unmanned aerial vehicle for surveying and mappings performs surveying and mapping in the region to be surveyed and mapped.

Fifth Embodiment

The fifth embodiment of the present disclosure further provides a computer storage medium storing a computer program, wherein the computer program, when executed by a computer processor, executes a method for planning sample points for surveying and mapping as described in any one of the foregoing embodiments of the present disclosure, the method comprising: acquiring a reference photographing location point corresponding to a region to be surveyed and mapped, and establishing a mapping relation between one shooting point in a combined shooting point set and the reference photographing location point; determining a plurality of auxiliary photographing location points corresponding to the reference photographing location point based on the mapping relation and a preset relative positional relation between each two shooting points in the combined shooting point set; and using the reference photographing location point and the plurality of auxiliary photographing location points as sample points for surveying and mapping based on which an unmanned aerial vehicle for surveying and mappings performs surveying and mapping in the region to be surveyed and mapped.

Any combination of one or more computer readable media may be used as the computer storage medium of the embodiment of the present disclosure. The computer readable medium may be a computer readable signal medium or a computer readable storage medium. The computer readable storage medium may be, for example but not limited to, an electronic, magnetic, optical, electromagnetic, infrared, or semiconductor system, apparatus, or device, or any combination of the foregoing. More specific examples (a non-exhaustive list) of the computer readable storage medium include: an electrical connection having one or more wires, a portable computer diskette, a hard disk, a RAM, a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, the computer readable storage medium may be any tangible medium that can contain, or store a program, and the program can be used by or used in connection with an instruction execution system, apparatus or device.

The computer readable signal medium may include a data signal carrying computer readable program codes therein, with the signal propagated in baseband or as part of a carrier wave. Such a propagated data signal may take any of a variety of forms, including, but not limited to, an electromagnetic signal, an optical signal, or any suitable combination thereof. The computer readable signal medium may be any computer readable medium other than a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), or the like, or any suitable combination of the foregoing.

Computer program code for carrying out operations of the present disclosure may be written in one or more programming languages or any combination thereof, including an object-oriented programming language such as Java, Smalltalk, C++ or the like, and conventional procedural programming languages such as the "C" programming language or similar programming languages. The program code may be executed entirely on the user's computer, executed partly on the user's computer, executed as a stand-alone software package, executed partly on the user's computer and partly on a remote computer or executed entirely on the remote computer or remote server. In a scenario involving a remote computer, the remote computer may be connected with the user's computer via any type of network, including LAN or WAN, or may be connected with an external computer (for example, via the Internet using an Internet Service Provider).

INDUSTRIAL APPLICABILITY

In the embodiments of the present disclosure, the prior parallel-line-based mobile planning mode is replaced with an overall planning of multiple surveying and mapping points based on a combined shooting point set, so that the problems of high cost and low surveying and mapping efficiency existing in the prior UAV-based aerial survey methods are avoided, the surveying and mapping cost is reduced, and the surveying and mapping efficiency is improved.

What is claimed is:

1. A method for planning sample points for surveying and mapping, comprising steps of:
   acquiring a reference photographing location point corresponding to a region to be surveyed and mapped, and establishing a mapping relation between one shooting point in a combined shooting point set and the reference photographing location point;
   determining a plurality of auxiliary photographing location points corresponding to the reference photographing location point based on the mapping relation and a preset relative positional relation between each two shooting points in the combined shooting point set; and using the reference photographing location point and the plurality of auxiliary photographing location points as sample points for surveying and mapping based on which an unmanned aerial vehicle for surveying and mapping performs surveying and mapping in the region to be surveyed and mapped, wherein the shooting points in the combined shooting point set include: a central shooting point and four peripheral shooting points, wherein the peripheral shooting points are four vertices of a rectangle centered at the central shooting point respectively;

a composite photo obtained by shooting based on all the shooting points in the combined shooting point set is of a rectangular shape;

before the determining a plurality of auxiliary photographing location points corresponding to the reference photographing location point based on the mapping relation and a preset relative positional relation between each two shooting points in the combined shooting point set, the method further comprises:

acquiring a photographing parameter of a photographing device carried by the unmanned aerial vehicle for surveying and mapping, wherein the photographing parameter includes a single-photo photographable region of the unmanned aerial vehicle for surveying and mapping at a set flying height, and each shooting point is corresponding to a single-photo photographable region; and determining the preset relative positional relation between each two shooting points in the combined shooting point set based on a preset photo overlap degree index and the single-photo photographable region, wherein using the reference photographing location point and the plurality of auxiliary photographing location points as sample points for surveying and mapping based on which an unmanned aerial vehicle for surveying and mapping performs surveying and mapping in the region to be surveyed and mapped comprises:

using the reference photographing location point and the plurality of auxiliary;

photographing location points as sample points for surveying and mapping based on which the unmanned aerial vehicle for surveying and mapping performs surveying and mapping at the set flying height in the region to be surveyed and mapped, the determining the preset relative positional relation between each two shooting points in the combined shooting point set based on a preset photo overlap degree index and the single-photo photographable region comprises:

determining a single-photo size based on a frame size of the photographing device and a pixel width of the photographing device;

constructing a two-dimensional coordinate system, and selecting a target point in the two-dimensional coordinate system as a central shooting point;

generating a central photo in the two-dimensional coordinate system based on the central shooting point and the single-photo size;

generating, at an upper left corner, a lower left corner, an upper right corner, and a lower right corner of the central photo, four respective peripheral photos that meet the photo overlap degree index relative to the central photo;

determining, based on a mapping relation between the single-photo size and the single-photo photographable region, a coordinate value of the respective peripheral shooting point corresponding to each peripheral photo in the two-dimensional coordinate system; and determining the preset relative positional relation between each two shooting points in the combined shooting point set based on the coordinates values of the central shooting point and all the peripheral shooting points in the two-dimensional coordinate system.

2. The method according to claim 1, wherein after the using the reference photographing location point and the plurality of auxiliary photographing location points as sample points for surveying and mapping based on which an unmanned aerial vehicle for surveying and mapping performs surveying and mapping in the region to be surveyed and mapped, the method further comprises:

sending each of the sample points for surveying and mapping to the unmanned aerial vehicle for surveying and mapping, so that a set of photos for surveying and mapping corresponding to the region to be surveyed and mapped are taken by the unmanned aerial vehicle for surveying and mapping when it flies to each of the sample points for surveying and mapping according to the set flying height, wherein all photos in the set of photos for surveying and mapping are configured to be synthesized into an image for surveying and mapping that matches the region to be surveyed and mapped.

3. A control terminal configured to control an unmanned aerial vehicle, wherein the control terminal comprises:

one or more processors;

a storage apparatus, configured to store one or more programs, the one or more programs, configured to cause, when executed by the one or more processors, the one or more processors to implement the method for planning sample points for surveying and mapping according to claim 1.

4. The method according to claim 1, wherein the acquiring a reference photographing location point corresponding to a region to be surveyed and mapped comprises:

detecting a touch operation performed by a user in a human-computer interaction interface and determining a screen location point based on the touch operation; and acquiring, from map data about the region to be surveyed and mapped that is currently displayed in the human-computer interaction interface, a geographic location coordinate matching the screen location point, and using the geographic location coordinate as the reference photographing location point.

5. The method according to claim 1, wherein the acquiring a reference photographing location point corresponding to a region to be surveyed and mapped comprises:

acquiring a central point of the region to be surveyed and mapped and using the central point as the reference photographing location point.

6. The method according to claim 1, wherein the acquiring a reference photographing location point corresponding to a region to be surveyed and mapped comprises:

sending location query information to the unmanned aerial vehicle for surveying and mapping, and using a geographic location coordinate fed back by the unmanned aerial vehicle for surveying and mapping as the reference photographing location point, wherein the unmanned aerial vehicle for surveying and mapping is pre-arranged at a location matching the region to be surveyed and mapped.

7. The method according to claim 4, wherein the detecting a touch operation performed by a user in a human-computer interaction interface and determining a screen location point based on the touch operation comprises at least one of the following:

determining a point touched by the user as the screen location point if it is detected that the touch operation performed by the user is a single-point touch operation;

selecting a point from a line segment generated by the touch operation performed by the user as the screen location point if it is detected that the touch operation performed by the user is a stroke touch operation; and selecting a point inside a box generated by the touch operation performed by the user as the screen location point if it is detected that the touch operation performed by the user is a box-drawing touch operation.

8. The method according to claim 1, wherein the acquiring a reference photographing location point corresponding to a region to be surveyed and mapped comprises:

acquiring a geographic location coordinate inputted by a user and using the geographic location coordinate as the reference photographing location point.

9. The method according to claim 1, wherein the establishing a mapping relation between one shooting point in a combined shooting point set and the reference photographing location point comprises:

establishing a mapping relation between the reference photographing location point and one shooting point selected by a user from the combined shooting point set.

10. The method according to claim 1, wherein the establishing a mapping relation between one shooting point in a combined shooting point set and the reference photographing location point comprises:

establishing a mapping relation between the central shooting point in the combined shooting point set and the reference photographing location point.

11. The method according to claim 1, wherein the establishing a mapping relation between one shooting point in a combined shooting point set and the reference photographing location point comprises:

calculating a distance between the reference photographing location point and each of key positioning points in the region to be surveyed and mapped, wherein the key positioning points include: corner points of the region to be surveyed and mapped and a central point of the region to be surveyed and mapped;

acquiring a key positioning point closest to the reference photographing location point and using the key positioning point as a target reference point; and selecting, based on location information on the target reference point in the region to be surveyed and mapped, one shooting point matching the location information from the combined shooting point set, and establishing a mapping relation between the shooting point and the reference photographing location point.

12. The method according to claim 1, wherein before the acquiring a photographing parameter of a photographing device carried by the unmanned aerial vehicle for surveying and mapping, the method further comprises:

calculating the set flying height based on a pixel width of the photographing device, a lens focal length of the photographing device, and a ground pixel resolution.

13. The method according to claim 1, wherein the acquiring a photographing parameter of a photographing device carried by the unmanned aerial vehicle for surveying and mapping comprises:

calculating, based on a pixel width of the photographing device, a frame size of the photographing device, and a ground pixel resolution, the single-photo photographable region of the unmanned aerial vehicle for surveying and mapping at the set flying height.

14. The method according to claim 1, wherein after the using the reference photographing location point and the plurality of auxiliary photographing location points as sample points for surveying and mapping based on which an unmanned aerial vehicle for surveying and mapping performs surveying and mapping in the region to be surveyed and mapped, the method further comprises:

sending each of the sample points for surveying and mapping to the unmanned aerial vehicle for surveying and mapping, so that a set of photos for surveying and mapping corresponding to the region to be surveyed and mapped are taken by the unmanned aerial vehicle for surveying and mapping when it flies to each of the sample points for surveying and mapping according to the set flying height, wherein all photos in the set of photos for surveying and mapping are configured to be synthesized into an image for surveying and mapping that matches the region to be surveyed and mapped.

15. An apparatus for planning sample points for surveying and mapping, comprising:

a mapping relation establishing module, configured to acquire a reference photographing location point corresponding to a region to be surveyed and mapped, and establish a mapping relation between one shooting point in a combined shooting point set and the reference photographing location point;

an auxiliary photographing location point determining module, configured to determine a plurality of auxiliary photographing location points corresponding to the reference photographing location point based on the mapping relation and a preset relative positional relation between each two shooting points in the combined shooting point set;

a module for determining sample points for surveying and mapping, configured to use the reference photographing location point and the plurality of auxiliary photographing location points as sample points for surveying and mapping based on which an unmanned aerial vehicle for surveying and mapping performs surveying and mapping in the region to be surveyed and mapped;

a module for acquiring a single-photo photographable region, configured to acquire a photographing parameter of a photographing device carried by the unmanned aerial vehicle for surveying and mapping, wherein the photographing parameter includes a single-photo photographable region of the unmanned aerial vehicle for surveying and mapping at a set flying height, and each shooting point is corresponding to a single-photo photographable region;

a relative positional relation determining module, configured to determine the preset relative positional relation between each two shooting points in the combined shooting point set based on a preset photo overlap degree index and the single-photo photographable region; and a module for determining sample points for surveying and mapping, configured to use the reference photographing location point and the plurality of auxillary photographing location points as sample points for surveying and mapping based on which the unmanned aerial vehicle for surveying and mapping performs surveying and mapping in the region to be surveyed and mapped at the flying height, wherein the combined shooting point set is a set of shooting points which are preset based on a preset distribution rule, in which a plurality of shooting points are included and each two shooting points have relative direction and relative distance relations therebetween;

the shooting points in the combined shooting point set includes a central shooting point and four peripheral shooting points, wherein the peripheral shooting points are four vertices of a rectangle centered at the central shooting point, and the relative positional relation determining module is configured to determine a single-photo size based on a frame size of the photographing device and a pixel width of the photographing device; construct a two-dimensional coordinate system, and selecting a target point in the two-dimensional coordinate system as a central shooting point, generate a central photo in the two-dimensional coordinate system based on the central shooting point and the single-photo size; generate, at an upper left corner, a lower left corner, an upper right corner, and a lower right corner of the central photo, four respective peripheral photos that meet the photo overlap degree index relative to the central photo: determine, based on a mapping relation between the single-photo size and the single-photo photographable region, a coordinate value of the respective peripheral shooting point corresponding to each peripheral photo in the two-dimensional coordinate system, and determine the preset relative positional relation between each two shooting points in the combined shooting point set based on the coordinates values of the central shooting point and all the peripheral shooting points in the two-dimensional coordinate system.

* * * * *